US012782495B2

(12) United States Patent
Hadad et al.

(10) Patent No.: US 12,782,495 B2
(45) Date of Patent: Nov. 3, 2026

(54) SYSTEM AND METHOD FOR ACCURATE POSITIONING OF END TERMINAL IN A WIRELESS NETWORK

(71) Applicant: RUNCOM Communication Ltd., Rishon Lezion (IL)

(72) Inventors: Zion Hadad, Rishon Lezion (IL); Baruch Globen, Rishon Lezion (IL)

(73) Assignee: RUNCOM Communications Ltd., Rishon Lezion (IL)

( * ) Notice: Subject to any disclaimer, the term of this patent is extended or adjusted under 35 U.S.C. 154(b) by 160 days.

(21) Appl. No.: 18/631,254

(22) Filed: Apr. 10, 2024

(65) Prior Publication Data

US 2024/0377501 A1 Nov. 14, 2024

(30) Foreign Application Priority Data

May 11, 2023 (IL) ........................................ 302884

(51) Int. Cl.
*G01S 5/06* (2006.01)
*G01S 5/02* (2010.01)
*H04W 64/00* (2009.01)

(52) U.S. Cl.
CPC ................ *G01S 5/06* (2013.01); *G01S 5/021* (2013.01); *G01S 5/02213* (2020.05); *H04W 64/00* (2013.01)

(58) Field of Classification Search
CPC ......... G01S 5/06; G01S 5/02213; G01S 5/021
USPC .......................................................... 342/451
See application file for complete search history.

(56) References Cited

U.S. PATENT DOCUMENTS 10,812,992 B1 * 10/2020 Tran ..................... H04B 7/0695
2012/0257575 A1 * 10/2012 Davydov ............. H04W 24/02
370/328

FOREIGN PATENT DOCUMENTS

WO WO-2023211595 A1 * 11/2023 ............ H04W 64/00

* cited by examiner

*Primary Examiner* — Harry K Liu
(74) *Attorney, Agent, or Firm* — Rivka Friedman

(57) ABSTRACT

The subject matter discloses at a single site (a site with a single base station), connecting a distributed antenna to a Radio Unit (RU) of a 4G/5G base station such that the antenna elements are deployed at the target area apart from each other. According to some embodiments the RU receives from each antenna element a replica of the radio signal that is transmitted by the end terminal. The RU processes the phase differences between the subcarriers of each pair of signal replicas which are received by the antenna elements. The RU calculates the DToA (Difference in Time of Arrival) per each pair of replicas of the received signal according to the phase difference. The location measurements of the end terminal are carried out by performing triangulation using the DToA measurements.

17 Claims, 8 Drawing Sheets

SYSTEM AND METHOD FOR ACCURATE POSITIONING OF END TERMINAL IN A WIRELESS NETWORK

FIELD OF THE INVENTION

The present disclosure relates to wireless networks in general, and to accurate positioning end terminals in a wireless network, in particular.

BACKGROUND OF THE INVENTION

Methods for positioning end terminals in a wireless network typically measure the intensity of the received RF signal by measuring the RSSI (Received Signal Strength Indication or RSSI). The accuracy of these solutions depends on the number of nearby Access Points.

Enhancing measurements accuracy is performed by Angle of Arrival using directional beams and MIMO (Multiple Input Multiple Output) multi-elements antenna combined with triangulation.

Other methods use Bluetooth Low Energy (BLE) beacons for indoor positioning.

DToA is a localization technique where known location antennas receive the same signal from the target end terminal and by measuring the Differential Time of Arrival enable to calculate the location of the Transmitting target end terminal. The problem is how to measure accurately the DToA.

SUMMARY OF THE INVENTION

The term computing device refers herein to a device that includes a processing unit. Examples of such a device are a personal computer, a laptop, a server, a wearable device, a tablet, a cellular device and IoT (internet of things) devices.

The term Distributed Antenna System (DAS) refers herein to a network of antennas that send and receive wireless signals.

The term antenna element refers herein to a certain radiating/receiving part of the distributed antenna.

The term RU refers herein to a Radio Unit.

The term end terminal refers herein to user equipment mobile unit and Internet of Thinks (IoT) terminals.

The term target end terminal refers herein to an end terminal whose position is required.

The term target area refers herein to the venue in which the system and the end terminals are located. An example of such a venue is a production floor or a warehouse. The target venue may be indoor or outdoor.

The term FFT refers to Fast Fourier Transform

The term $FFT^*(r_i)$ refers herein to the conjugate of $FFT(r_i)$.

The term neighbor end terminal refers herein to an end terminal that is in the same target area as the target end terminal.

The term DMRS refers to Demodulation Reference Signal.

The term SRS refers to Sounding Reference Signal.

The term DToA refers to Differential Time of Arrival.

The term PS refers to Positioning Sensor.

The term DCI refers herein to Downlink Control Information.

The term CRNTI refers herein to Cell Radio Network Temporary Identifier.

The term accurate positioning refers to accuracy range of a centimeter or less.

The term N refers to the size of the FFT (number of bins).

One technical problem disclosed by the present disclosure is how to enhance the positioning accuracy of a 4G or 5G wireless system end terminal to a centimeter accuracy range. Such a need is required in environments like production floors, robotic systems, warehouses etc.

One technical solution is at a single site (a target area with a single base station), connecting a distributed antenna elements to a Radio Unit (RU) of a 4G/5G base station such that the antenna elements are deployed at the coverage target area apart from each other. Each antenna element is connected via a separate front-end receiver, which decodes and digitizes the received signal.

According to some embodiments the RU receives from each antenna element frontend receiver a replica of the radio signal that is transmitted by the target end terminal. The RU converts s the radio signal to frequency domain by Fast Fourier Transform (FFT) and then processes using N sampled points (FFT size), the phase differences between the replica's subcarriers. The magnitude of the phase differences is translated to time of arrival relative to the reference sampling time of the receiver. The processing is carried out for each pair of digitized signal replicas which are received by the antenna elements frontend receivers. Linking all replicas to the same RU with a common reference sampling time for all antenna elements frontend makes the measurement of the DToA simple, with no need for complex calibration process and provides an accurate measurement. The location measurements of the end terminal are carried out by performing triangulation using the DToA measurements.

It should be noted that the Up Link processing may be done by the Radio Unit (RU) or by the end terminal. In case of Downlink (DL) the RU transmits through the antenna elements orthogonal signals that enable the target UE receiver to separate between them and measure the ToA of each one of them in the same method as described for the UL case. The subtracting between the measurements provides the DToA from the known location of the distributed antenna elements and enables calculating its location.

The distributed antenna includes at least 3 parts, sets of element groups each connected to a common radio unit (RU). For more than 3 elements DAS, the RU processor selects the best (best signal to noise ratio—SNR) replicas.

The technical solution also supports 3D (Dimension) positioning. The technical solution may also work outdoors.

Such a solution resolves the time difference measurement beyond the sampling time resolution. The processing is carried out after the digitization and FFT processing yielding extra resolution and measurements accuracy, up to 2-3 magnitudes of order compared with regular DToA measurements.

The method allocates resources adaptively. The MAC scheduler is adaptively allocating number of RB's for the localization signals (SRS or CSRS or PRS or DMRS) according to Signal to Noise ratio—SNR anticipated at the receiver and considering the required localization accuracy. Processing Gain equals to number of UE subcarriers allocated in the OFDM signal and the time.

One technical side effect of the present disclosure is revoking the need for synchronization of a signal that is received by a plurality of RUs. The revoking is due to receiving and processing replicas of the same radio signal at a single RU providing a common source for clock signal.

One other technical side effect of the present disclosure is the canceling of the random time shift (jitter). The cancellation is due to processing is carried out by a single RU using a common reference clock at all antennas radio frontend receivers to process the differential time of arrival.

Canceling the jitter enhances the measurements performance and accuracy.

One other technical side effect disclosed by the present disclosure is revoking the need to measure the DToA by a sampling process with sampling period of less than 30 picoseconds. The side effect is acquired due to the measurements of the phase differences between the mating subcarriers of received signal replicas collected at each antenna element/frontend receiver.

According to some embodiments the system includes one or more pre-known position end terminals installed at pre-known locations. The pre-known location end terminals are used for calibrating the measurements and for enhancing the accuracy of the target end terminal positioning process.

According to some embodiments the system calibrates the antennae connecting cable delays and other imperfections by performing a pre-test.

According to some embodiments the calibration is performed by measuring, by the system, the location of the reference end terminal and comparing this computed location with its pre-known location and apply correction if needed.

According to some embodiments, to improve performance especially at outdoor scenarios, only the OFDM Reference Signal (RS) subcarriers (such as DMRS and SRS) are used to measure the differential time of arrival enabling to exclude the impact of radio interferers. Such interferers may be users of other base stations. The Reference Signal scrambling reduces the effect of non-correlated signals and improves the Signal to Noise Ratio (SNR) by a factor related to the scrambling sequence length such that other users/interferers which have a different scrambling sequence or non-scrambled interferers are attenuated.

The scrambling sequence parameters are unique for each end terminal and are delivered by the Distribution Unit (DU) to the Radio Unit. For Narrow Band (NB) interferes, the interfered sub-carriers which may present an extra-irregular Phase Difference can be omitted in order to avoid the contribution of the interfered subcarriers.

One other technical solution is deploying a plurality of Positioning Sensors (PS) at pre-known locations in the target area. The PS are linked with the Localization Server in the Cloud by a relatively narrow band link used for control and collection of the time measurements. Each PS is a computing device that includes a radio receiver and a digital signal processor. The receiver collects the radio signal that is sent from the end terminals. The processor handles the radio signal to calculate the time of arrival of the target end terminal. Each PS delivers data related to the location of the target end terminal via the base station or another connection to the Core. The Core performs differentiation and triangulation on the measurements that are received from the plurality of PS units for enhancing the location accuracy of the target user equipment.

The solution may be implemented with a plurality of base stations or with a single base station but includes a plurality of low-cost PS units.

Performing the positioning measurements preprocessing at the PS minimizes the IQ sampled Rx data (w/o preprocessing can reach Gbps in regular access f) transferred between the PS and the base-station.

In some embodiments for improving the accuracy, a Line of Sight (LoS) conditions between the target User Equipment and the Positioning Sensor is maintained. The PS units are deployed such that at least 3 or more PS units are at LoS with the target end terminal.

The control information and data transfer between each PS and the base-station may be performed by a very low-capacity link.

One other technical solution used in the Downlink is at a target area with a plurality of base stations, receiving a signal by an end terminal from the nearby base stations and processing time of arrival (ToA) measurements related to each base-station that transmit an orthogonal signals; delivering the measurements results to the core server for locating the end terminal. The locating is by performing differentiation and triangulation on the measurements.

One other technical solution is utilizing end terminals, acting as PS unit with a known position (Reference), for locating a neighboring target end terminal. According to some embodiment the target end terminal transmits an SRS signal or a DMRS. The signal is received by the neighboring end terminals. The neighboring end terminal calculates the Time of Arrival (ToA) from the received SRS signals and transmits the ToA parameters to the Core positing function. The Core server subtracts the received ToA and accordingly creates a DToA received from several known position end terminals The Core servers calculate the location of the target end terminal based on the DToA created from the references Time of Arrival received from the plurality of the neighboring end terminals.

One exemplary embodiment of the disclosed subject matter a method the method comprises: at a single site of a radio network; the single site comprises Distributed Antenna System (DAS); the Distributed Antenna System (DAS) comprises at least three antenna elements; the antenna elements being deployed in the single site apart from each other and being in connectivity with a common Radio Unit with a plurality of audio frontend receivers each per antenna element; receiving, replicas of a radio signal transmitted by a target end terminal, each of the replicas being received from an antenna element of the distributed Rx antenna;

By FFT (Fast Fourier Transform), transforming each of the replicas into a complex subcarriers vector in the frequency domain; wherein each complex element of the complex vector represents a sub carrier of the radio signal;

calculating a phase difference between corresponding subcarriers of each pair of the complex vectors to thereby generating a Phase Difference phasors vector; and calculating, from the phase difference phasors vector a differential time of arrival to, thereby accurately position the user end terminal in accordance with the differential time of arrival measurements.

According to some embodiments, transforming comprises sampling and digitalization and conversion to frequency domain. According to some embodiments the method further comprising calibrating positioning process by comparing the positioning to a pre known position of an end terminal.

One other exemplary embodiment of the disclosed subject matter is a system of a single site of a radio network; the system comprises Distributed Antenna System (DAS) and a radio unit; the Distributed Antenna System (DAS) comprises at least three antenna elements; the antenna elements being deployed in the single site apart from each other and being in connectivity with the Radio Unit with a plurality of radio frontend receivers each per antenna element; the radio unit is configured for receiving, replicas of a radio signal transmitted by a target end terminal, each of the replicas being received from an antenna element of the distributed Rx antenna; By FFT (Fast Fourier Transform), transforming each of the replicas into a subcarriers complex vector in the frequency domain; wherein each complex element of the complex vector represents a sub carrier of the radio signal; calculating a phase difference between corresponding subcarriers of each pair of the complex vectors to thereby generating a Phase Difference phasors vector; and calculating, from the phase difference phasors vector a differential time of arrival to, thereby accurately position the user end terminal in accordance with the differential time of arrival measurements.

According to some embodiments the system further comprising a known position unit in connectivity with the radio unit; the known position unit being configured for calibrating the positioning process.

One other exemplary embodiment of the disclosed subject matter is a method, the method comprises: at a target area, the target area comprises at least three positioning sensors: receiving, by a positioning sensor of the positioning sensors, a radio signal, the radio signal being transmitted from a target end terminal; by the positioning sensor, transforming the radio signal into a complex digital vector; the vector comprises complex elements, each complex element representing a subcarrier of the radio signal. by the positioning sensor, calculating a phase difference between subcarriers of the digital vector and an internal clock related reference; by the positioning sensor calculating, Time of Arrival (ToA), from the phase difference between the radio signal and the internal clock related reference to, thereby, accurate positioning of the target end terminal in accordance with the time of arrivals received from the at least three positioning sensors.

According to some embodiments the method the positioning sensor comprises a radio receiver and a digital signal processor. According to some embodiments the method further comprising monitoring by a Centralized Cloud Positioning Server linked by a communication channel, the communication channel being wired or Wireless channel; Wherein the Cloud Positioning Server sets at pre-allocated slot time a control signaling including allocated resources for a plurality of User Terminals transmitting in the Slot, the allocation is in time and frequency the frequency being OFDMA symbol and RB's Subcarriers in frequency for 4G/5G, the positioning units return the time of arrival (ToA) measurements in a short message. According to some embodiments the CPS Calibration process collects the ToAs delivered from the sensors and carries out calibration of an internal processing delay for each sensor using a pre-known locations User Equipment and applying corrections to the Unknown location user equipment measured Time of Arrival. According to some embodiments the CPS for each User Equipment processes a corrected ToA from different Sensors and creates DToA by subtracting between mating measurements results and applying localization and mapping algorithm, Wherein the CPS DToA algorithm is applied for LoS (Line of Sight) by selecting a LOS linked Positioning Sensors for increasing the probability for LoS and by applying selection from a set of PSs that yields close positioning results and omit Positioning Sensors which position measurements cause a diversion in the processing convergence. According to some embodiments for near and non-line of sight—NLoS the CPS applies a finger printing algorithm coupled with artificial intelligence learning the ToA fingerprint stamp arriving from the sensors at training time, training begins with known location elements and creates data sets that enable a DL-Deep Learning inference network model for the localization in the coverage area.

One other exemplary embodiment of the disclosed subject matter is a system at a target area, the system comprises at least three positioning sensors and a target end terminal; the target end terminal is configured for transmitting a radio signal; the positioning sensor is configured for receiving the radio signal, the radio signal being transmitted from a target end terminal; for transforming the radio signal into a complex digital vector; the vector comprises complex elements, each complex element representing a subcarrier of the radio signal; calculating the phase difference between subcarriers of the digital vector and an internal clock related reference; for calculating Time of Arrival (ToA), from the phase difference, between the radio signal and the internal clock related reference to, thereby, executing accurate positioning of the target end terminal in accordance with the time of arrivals received from the at least three positioning sensors.

One other exemplary embodiment of the disclosed subject matter is a method the method comprises: at a radio network, the radio network comprises at least three radio base stations, receiving BCH (Broadcast Channel) signals; the BCH being transmitted from a radio base station of the at least three radio base stations; the BCH being received at a target end terminal; by the target end terminal, processing the BCH into a complex digital vector, wherein each complex element of the vector representing a Reference Signal subcarrier of the BCH; by the target end terminal, calculating a phase difference between subcarriers of the digital vector and an internal clock related reference; by the target end terminal, calculating a Time of Arrival (ToA), from the phase difference, between the BCH signal and the internal clock related reference to, thereby, accurate positioning of the target end terminal in accordance with the differential time of arrivals calculated from at least 3 BCH signals transmitted from the at least three radio base stations.

One other exemplary embodiment of the disclosed subject matter is a system of a radio network, the system comprises: at least three radio base stations, and a target end terminal; the radio base station being configured for transmitting a BCH (Broadcast Channel) signal; the target end terminal being configured for receiving the BCH (Broadcast Channel) signals, for processing the BCH into a complex digital vector, wherein each complex element of the vector representing a Reference Signal subcarrier of the BCH; for calculating a phase difference between subcarriers of the digital vector and an internal clock related reference; for, calculating Time of Arrival (ToA), from the phase difference between the BCH signal and the internal clock related reference to, thereby, accurate positioning of the target end terminal in accordance with the differential time of arrivals calculated from at least 3 BCH signals transmitted from the at least three radio base stations.

One other exemplary embodiment of the disclosed subject matter is a method the method comprises: at an area of a radio network, the radio network covers a target area and comprises in the target area a target end terminal and at least three known location neighboring end terminals; receiving by a neighboring end terminal from the neighboring end terminals, an SRS signal, the SRS signal being transmitted from the target end terminal; by the neighboring end terminal, detecting and transforming the SRS signal into a complex digital vector, the vector comprises complex elements; each complex element representing a subcarrier of the SRS signal. by the neighboring end terminal, calculating a phase difference between subcarriers of the digital vector and an internal clock related reference; by the neighboring terminal calculating Time of Arrival (ToA), from the phase difference between the SRS signal and the internal clock related reference to, thereby, accurate positioning the target end terminal in accordance with the differential time of arrivals received from the at least three neighboring end terminals. According to some embodiments the SRS message being transmitted in response to a request from a radio base station.

One other exemplary embodiment of the disclosed subject matter is a system at an area of a radio network, the radio network covers a target area, the system comprises: in the target area a target end terminal and at least three known location neighboring end terminals; target end terminal is configured for transmitting an SRS signal, the SRS signal being transmitted from the target end terminal; the known location neighboring end terminals are configured for receiving the SRS signal, for transforming the SRS signal into a complex digital vector, the vector comprises complex elements; each complex element representing a subcarrier of the SRS signal, for calculating a phase difference between subcarriers of the digital vector and an internal clock related reference and calculating Time of Arrival (ToA), from the phase difference, between the SRS signal and the internal clock related reference to, thereby, accurate positioning the target end terminal in accordance with the time of arrival received from the at least three neighboring end terminals.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

Figure 7:
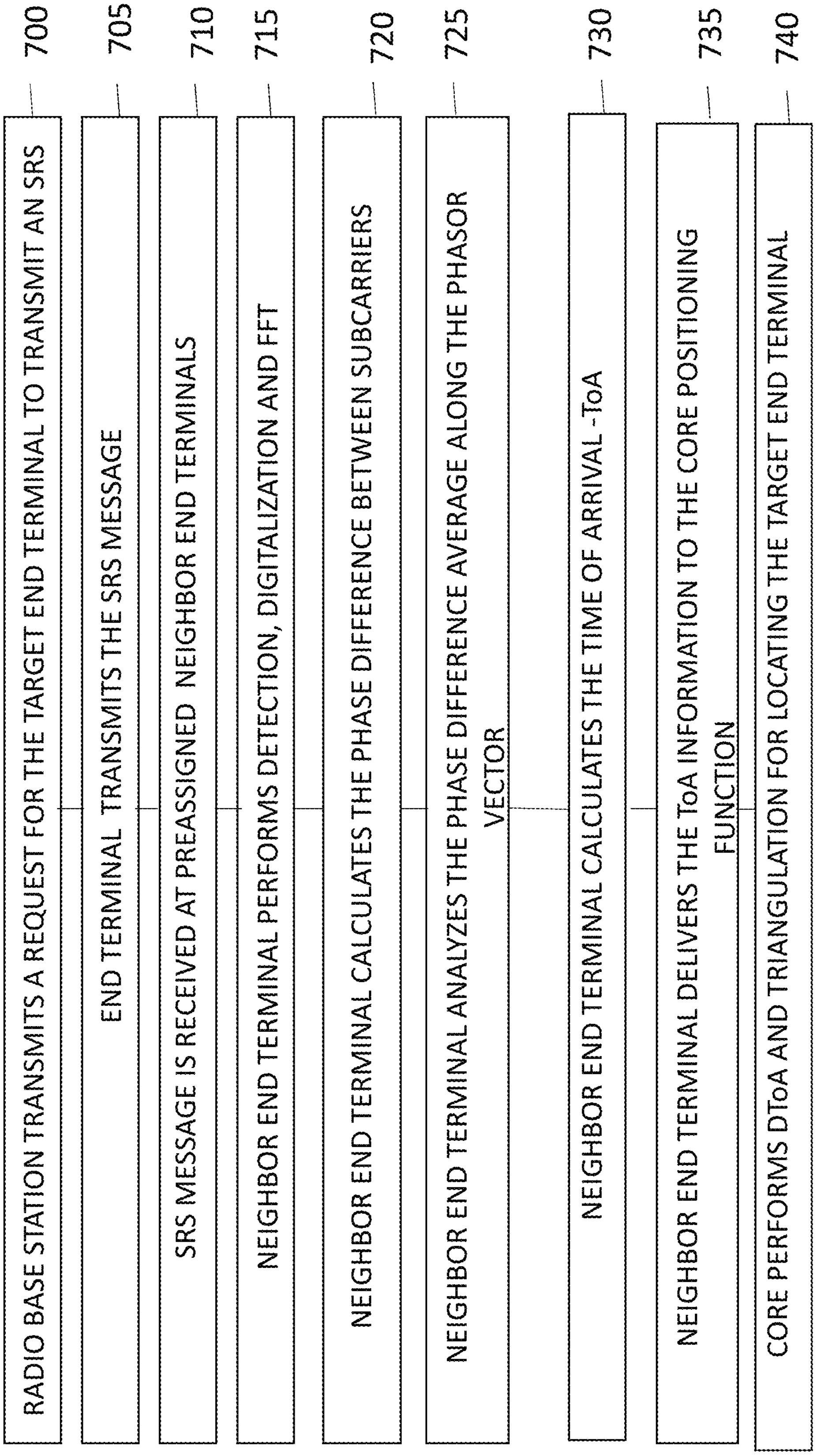
Figure 8:
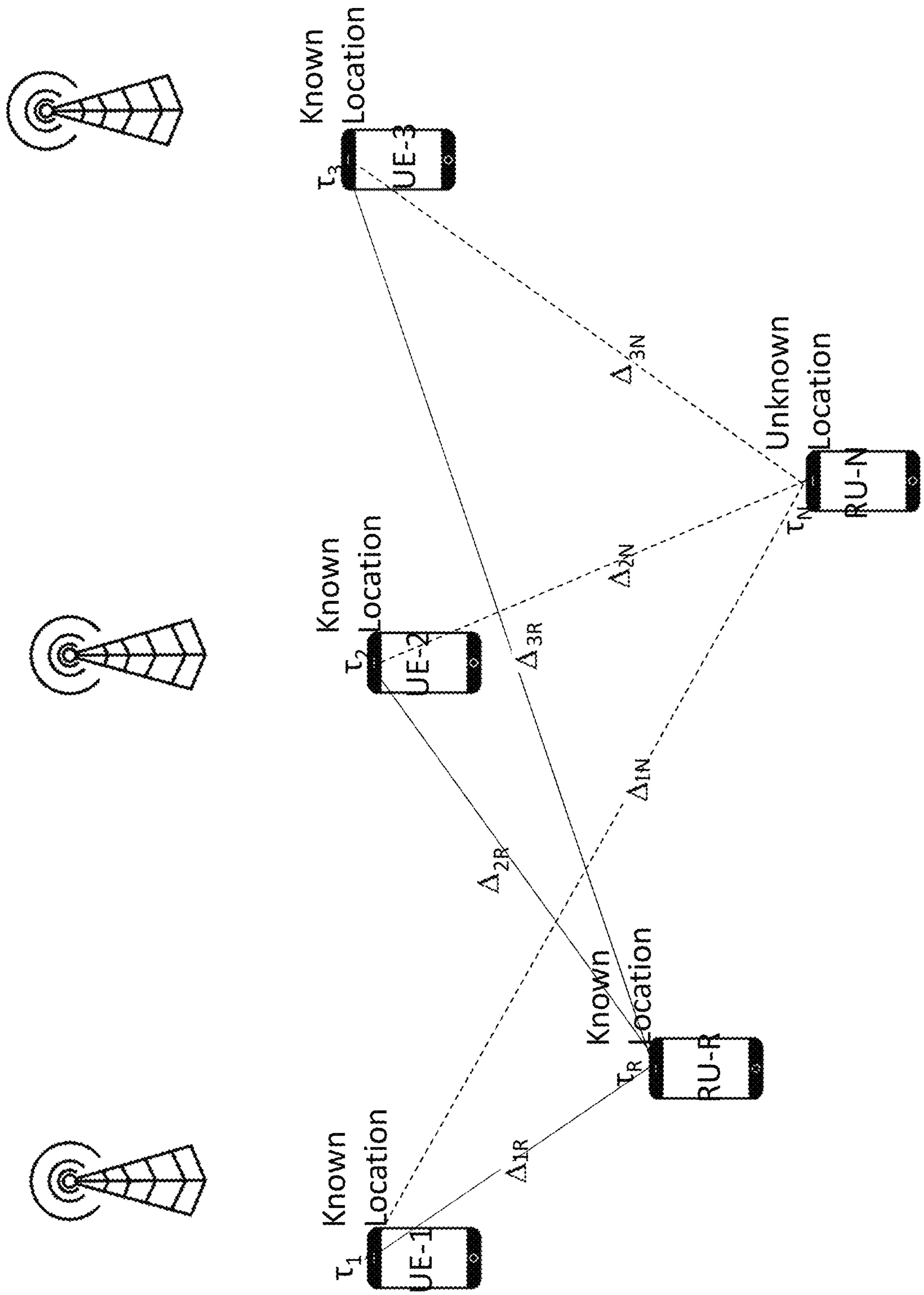

FIG. 7 shows a flowchart diagram of a method for accurate positioning end terminal in a wireless network by neighbor end terminals, in accordance with some exemplary embodiments of the disclosed subject matter; and FIG. 8 shows the timing situation including propagation time and local time shift at the network elements for measuring the time of arrival by using neighboring known location end terminals.

DETAILED DESCRIPTION

Figure 1:
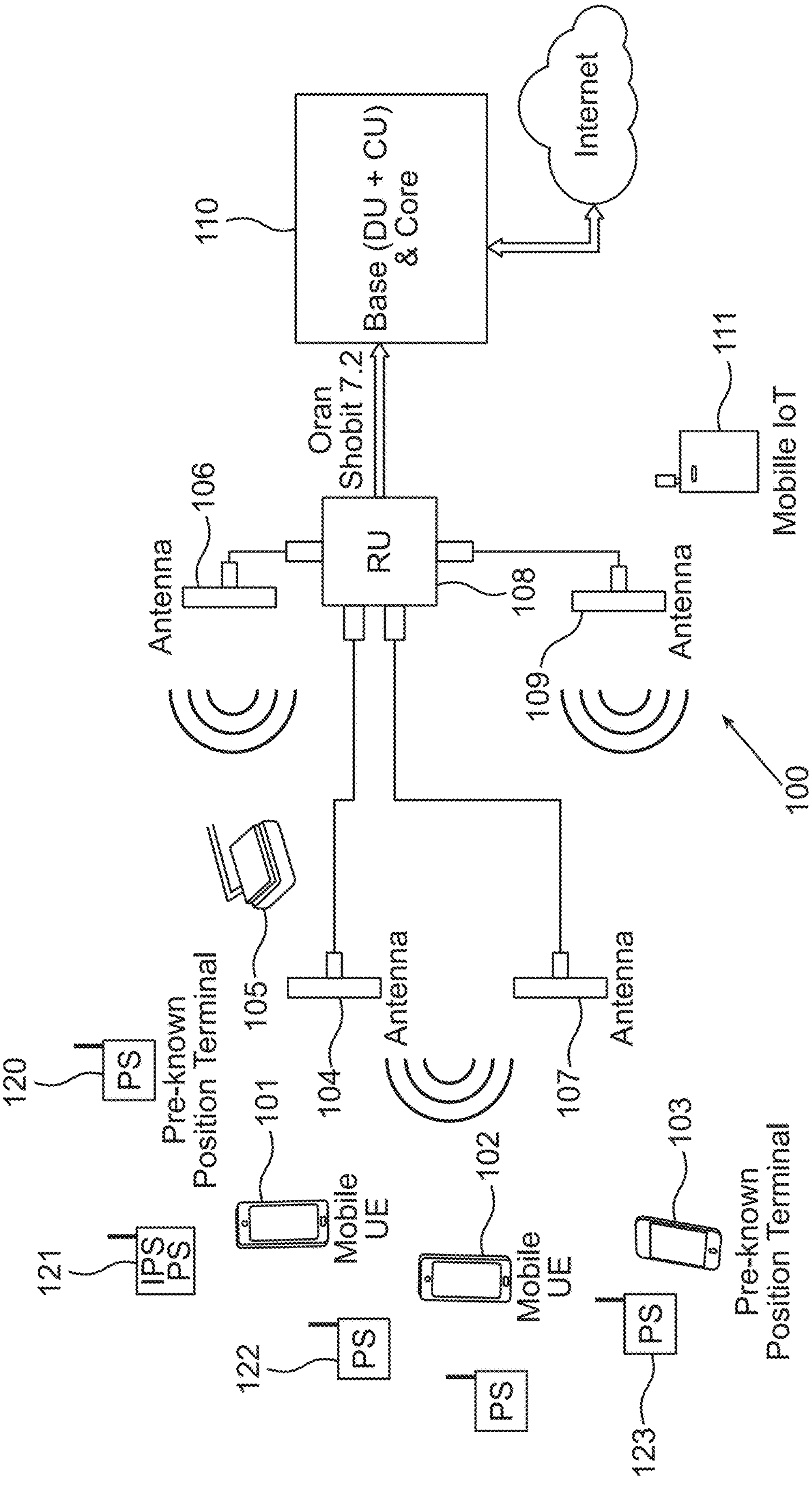
FIG. 1 shows a block diagram of a system for accurate positioning of end terminals in a wireless network, in accordance with some exemplary embodiments of the subject matter.

FIG. 1 shows a block diagram of an environment for positioning user equipment in a wireless network, in accordance with some exemplary embodiments of the subject matter.

System 100 includes antenna elements such as those indicated by numbers 105, 106, 107 and 109, an RU 108, end terminal such as those indicated by the numbers 101, 111 and 102, pre-known position unit 103, wireless base station (core unit) 110 and a plurality of PS (Positioning Sensors) shown as 120,121,122,123 and 124.

The plurality of antenna elements are connected to the RU unit 110 by coaxial cables or by fiber optic cables. The plurality of antenna elements may communicate with the RU 108 by, RF signals or by eCPRI (enhanced Common Public Radio Interface) standard protocol.

The plurality of antenna elements are configured for receiving the 4G/5G OFDM (Orthogonal Frequency Division Multiplexing) radio signals and for handing the received signals to the frontend receivers of the RU 108.

The RU (Radio Unit) 108 is configured for receiving the OFDM radio signals from the antenna elements and for processing the signals. The processing includes phase difference measurements as explained in greater detail in FIG. 3. The phase measurements enable to enhance the precision in measuring the DToA (Difference in Time of Arrival) between the replicas which are received by the antenna parts and to enhance positioning processing using the DToA measurements.

The RU (Radio Unit) 108 is configured for transferring the processed measurements to the system Core via the base station 110.

The base station 110 includes a distributing unit (DU) and a central unit (CU). The base station 110 is connected to the system Core (not shown in the figure) and via the Core to the Internet. In some embodiments base station 100 is deployed outside of the target area while the RU (Radio Unit) is deployed at the target area.

The pre-known position unit 103 is configured for calibrating the positioning measurements process of the target end terminal. The pre-known position unit 103 is connected to the RU 108 by a cable in order to directly connect with the same system timing and frequency and to avoid noise and jitter induced when wirelessly connected.

The plurality of PS (Positioning Sensors) shown as 120, 121,122,123 and 124 are configured for sensing the ToA (Time of Arrival) of a target end terminal. The PS collects the signal of the target end terminal, detects and digitizes the signal and performs FFT (Fast Fourier Transformed) on the digitized signal. The PS measures the phase change throughout the received signal symbol subcarriers compared with its internal clock reference time. The PS delivers the ToA parameters via the base station to the core servers for locating the target end terminal.

Each of the plurality of PS units shown as 120,121,122, 123 and 124 is connected to the base station 110 via a narrow band link for transferring the ToA parameters to the base station 110.

The PS includes a radio receiver (not shown in the figure) and a processor.

The PS clock and time is synchronized using GPS or by locking on the base-station signal or by IEEE 1588 radio messages.

Figure 2:
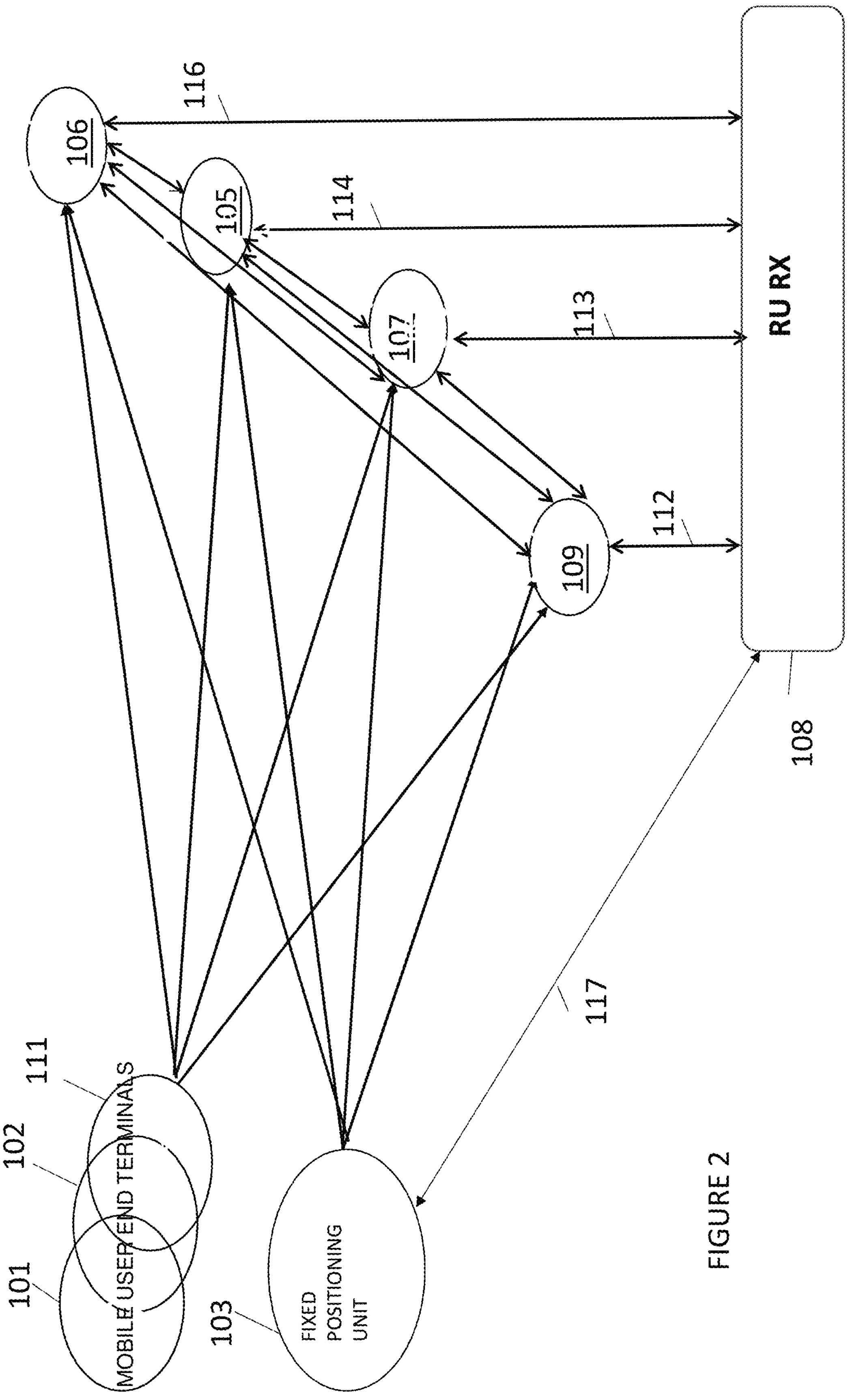
FIG. 2 shows a block diagram of the logical connectivity's in the system for positioning end terminals in the wireless network, in accordance with some exemplary embodiments of the disclosed subject matter.

FIG. 2 shows a logical block diagram of the connectivity in a system for positioning end terminal in a wireless network, in accordance with some exemplary embodiments of the disclosed subject matter.

Antenna 107 is wired to the RU 108 with a cable 113. The cable can be for example, coaxial cable or a fiber optic cable using eCPRI linking standard or other.

Antenna 109 is wired to the RU 108 with a cable 112. The cable can be for example, a coaxial cable or a fiber optic cable using eCPRI linking standard or other.

Antenna 105 is wired to the RU 108 with a cable 114. The cable can be for example, a coaxial cable or by a fiber optic cable using eCPRI linking standard or other.

Antenna 106 is wired to the RU 108 with cable 115. The cable can be for example, coaxial cable or by a fiber optic cable using eCPRI linking standard or other.

The cables connections of the antennas to the RU may implement physical layer split option 8 of the 5G RAN concepts. Other options like (used by O-RAN) split 7.x or 6 or another can also be used.

The distributed antenna elements receive RF signals from the end terminal and transfer the received signals (replicas of the same signal) which is generated by the target end terminal) to the RU 108 for processing.

Each replica is detected and digitized by a separate frontend receiver. In some embodiments the antennas (shown in the figure as 107, 109, 105 and 166) are wirelessly cross linked for calibrating purposes avoiding the need for the pre-known position unit (103).

The pre-known position end terminal 103 is wired to the RU 108 with cable 117. The cable can be for example, a coaxial cable or a fiber optic cable using eCPRI linking standard or other. The pre-known location unit 103 signal supports RU 108 calibration process.

Each of the user equipment units such as those indicated by the numbers 101,102 and 111 is wirelessly connected to each of the antenna parts shown as 109,107,105 and 106. Each of the end terminals transmits and receives mobile wireless air interface signals.

When using the pre-known position unit 103 for RU processing calibration, the clock signal of the pre-known position end terminal 103 is directly provided by the RU (over a cable) for reducing the jitter and noise of the pre-known position unit and for enhancing the measurements accuracy.

When using the loopback method for calibrating the positioning process, the calibration process takes into account the known position of the DAS elements and by that eliminates the need for the pre-known position end terminal (103).

Figure 3:
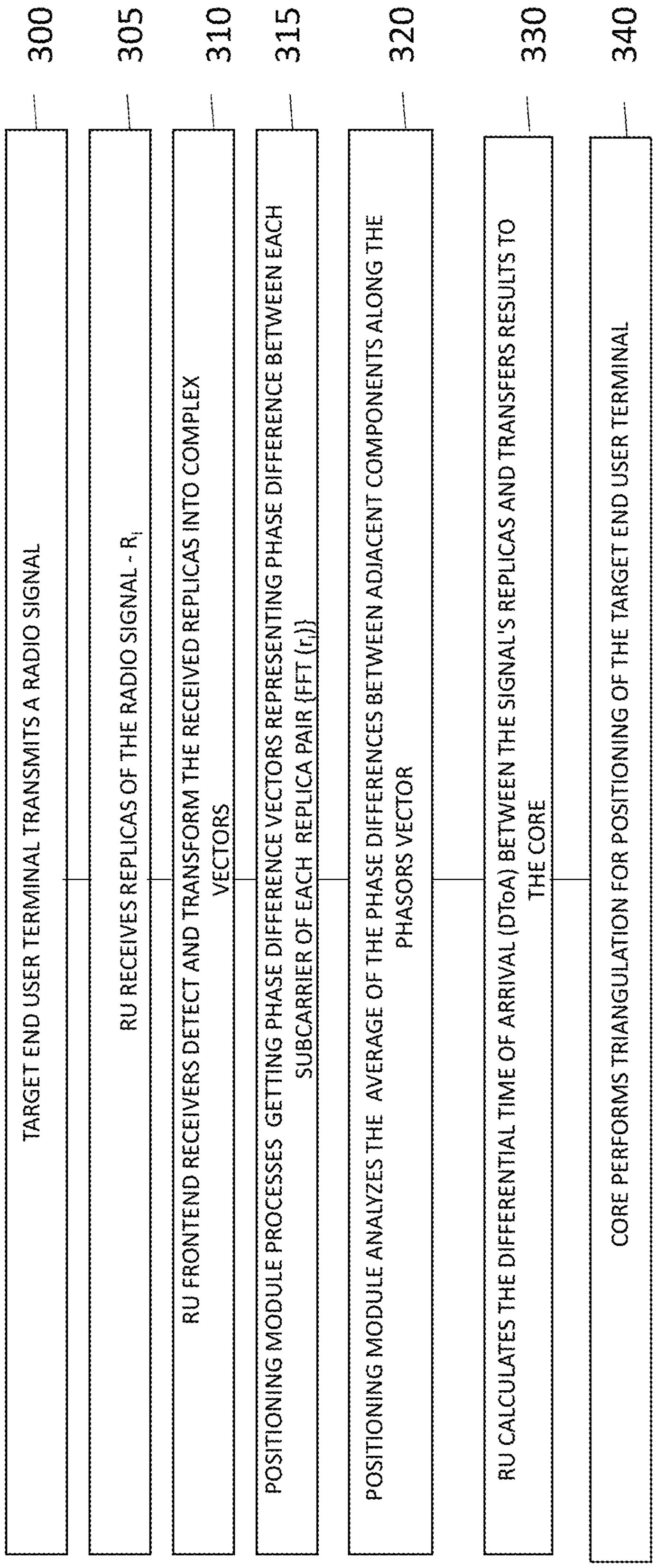
FIG. 3 shows a flowchart diagram of a method for accurate positioning of end terminals in a wireless network by distributed antenna elements, in accordance with some exemplary embodiments of the disclosed subject matter.

FIG. 3 shows a flowchart diagram of a method for accurate positioning target end terminals in a wireless network, in accordance with some exemplary embodiments of the disclosed subject matter.

The positioning measurements preprocessing is performed by a positioning module, The positioning module may be implemented as a software module or as a hardware module and may be implemented as part of the RU. The accurate positioning is accomplished by a positioning function at the system Core.

At block 300, the target end terminal mobile unit transmits a radio signal.

At block 305, the RU DAS elements receive replicas of the radio signal—$r_i$, each replica is delivered by one of the DAS antenna elements. In one example, the system includes three antenna elements and, thus, the RU receives three signal replicas. It should be noted that the position of the DAS elements is known.

At block 310, the RU front end performs detection, digitalization and FFT (Fast Fourier Transform) for each replica to transform the received radio replicas into complex digital vectors, each vector includes M complex elements, herein {FFT ($r_i$)}. Each complex element represents a sub-carrier. M represents the total number of OFDM signal subcarriers allocated for the target end terminal which positioning is in process.

At block 315, the positioning module calculates the phase difference between each subcarrier of each pair {FFT ($r_i$)} by calculating FFT ($r_i$)*FFT*($r_i$) for all "j" excluding "i". In the example of three antenna elements the RU positioning module calculates FFT (1)*FFT*(2) per each subcarrier for retrieving the phase difference between the signals received from antenna part (1) and antenna part (2), FFT (1)*FFT*(3) per each subcarrier for retrieving the phase difference between the signals received from antenna part (1) and antenna part (3) and FFT (2)*FFT*(3) per each subcarrier, for retrieving the phase difference between the signals subcarriers received from antenna part (2) and antenna part (3).

The multiplication of the Sub-Carriers (SC) vector with the replica conjugate of its mating subcarriers yields the Phase Difference (PD) phasors vector which provides the phases between the subcarriers of the processed signals replicas. The vector elements envelop present the pattern of the phase differences along the subcarriers from 1 to M.

The envelop of the pattern of the phase differences is sinusoidal and comprises two parts. The first part is composed of an integer number of sinus periods. Each sinus period represents a signal sampling time delay within the differential time of arrival of the pair {FFT ($r_i$), FFT ($r_j$)}. The second part is the tail, which includes a fragment of a sinusoidal period.

At block 320 the positioning module analyzes the average phase difference change between adjacent elements along the phasors vector. The average is multiplied by N and is divided by 2π to get K, J and L. K is an integer number providing the number of full periods, J is the quantity of subcarriers within a signal sampling period. and L is the quantity of subcarriers in the phase pattern tail.

To enhance the processing results the allocated Resource Element Blocks (REB) for the target end terminals are maximized during the positioning process and no neighboring REBs are allocated.

At block 330, the RU calculates the Differential Time of Arrival (DToA) between the signal's received replicas.

The $DToA_{uj}$ between two analyzed replicas (i and j) is calculated as follows:

K*(signal sampling duration time)+L/J*(signal sampling duration time) yielding:

$$DToA_{uj} = (K + L/J) \cdot T_s$$

Where $T_s$ is the signal sampling duration time.

At block 340 the Core Positioning Function unit performs triangulation for locating the target end terminal position. The triangulation is based on the differential time of arrival measurements, location of the known location of the DAS antenna elements and the speed of light. The triangulation can be done by conventional methods solving a set of hyperbolic equations.

Figure 4:
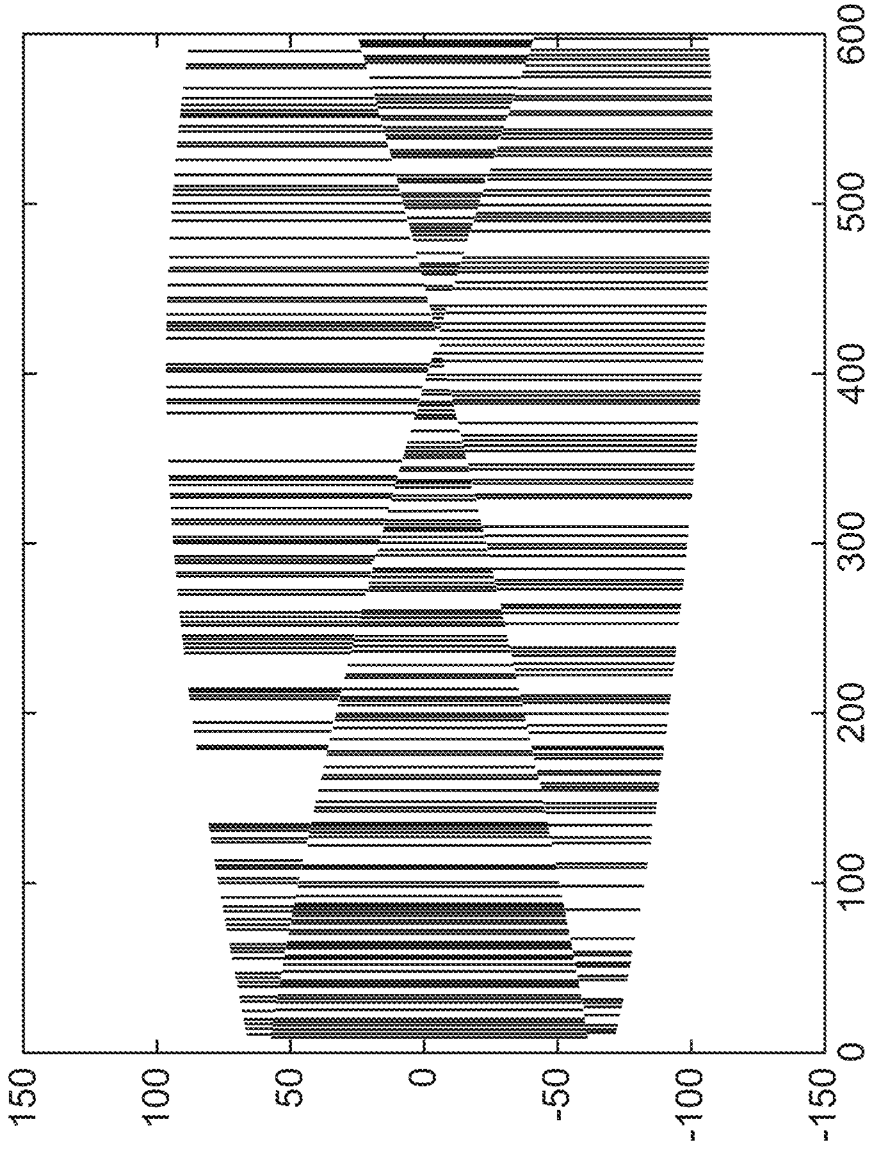
FIG. 4 shows a fragment exemplary phase differential pattern, in accordance with some exemplary embodiments of the disclosed subject matter.

FIG. 4 shows a fragment exemplary phase differential pattern (before descrambling), in accordance with some exemplary embodiments of the disclosed subject matter. The X axis represents the sub-carrier index. The Y axis represents the phase magnitude.

Figure 5:
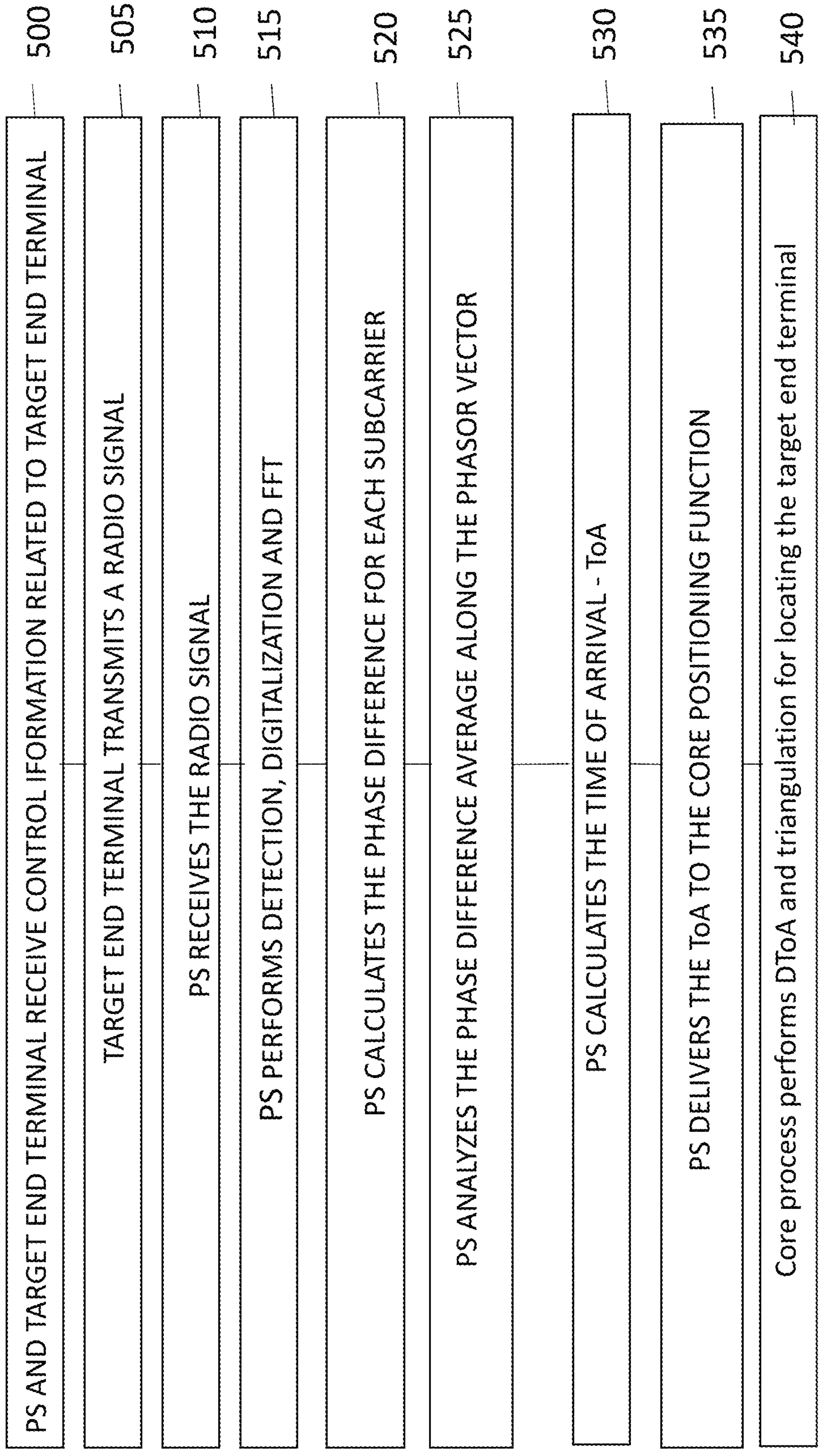
FIG. 5 shows a flowchart diagram of an accurate end terminal positioning method in a wireless network by a Positioning Sensors, in accordance with some exemplary embodiments of the disclosed subject matter.

FIG. 5 shows a flowchart diagram of a method for positioning end terminal in a wireless network by Positioning Sensors (PS), in accordance with some exemplary embodiments of the disclosed subject matter.

According to some embodiment a plurality of Positioning Sensors is located in the target area for performing the preprocessing of the accurate positioning process. The PS units are deployed at the target area such that at least 3 or more PSs are at Line of Sight with the target end terminal.

Such a measurements method enables the transfer of limited information bandwidth to meet the requirements for providing accurate positioning since the pre-processing is already performed at the PS units.

The positioning measurements preprocessing is performed by a positioning module. The positioning module may be implemented as a software module or as a hardware module as part of the Positioning Sensors (PS).

At block 500 the PS receives the target end terminal related control information delivered by the base station. The information includes allocated REBs details, Sounding RS (SRS) location or/and data DMRS, UE CRNTI and scrambling sequence parameters for e.g., 4/5G waveforms.

In some cases, the PS receives the DCI (Downlink Control Information) of the end terminal over the air using the target UE delivered CRNTI parameter.

In some embodiments for enhancing performance under interference the PS uses signal RS related measurements after descrambling.

At block 505, the target end terminal transmits a radio signal according to the pre-received control information (DCI).

At block 510, the PS receives the target end terminal radio signal (r). The PS receives and decodes the radio signal (r) using the target end terminal related control information.

At block 515, the PS performs detection, digitalization and FFT (Fast Fourier Transform) of the radio signal (r) yielding a complex digital vector, the vector includes M complex elements, herein {FFT ($r_i$)}. Each complex element represents a subcarrier. M represents the total number of OFDM signal subcarriers in a received symbol allocated for the target end terminal. If there is no information on the scrambling sequence parameters, envelop detection is carried out followed by absolute value process and looking for the distance between the envelop minimum points. These minimum points are π (180°) degrees apart. By sine wave curve fitting, the best sine wave fit can be found enabling accurate processing of the ToA and for calculating the DToA.

Block 515 may also apply where no pilots are available in the data signal.

At block 520, the PS calculates the phase difference between each subcarrier of the digital vector and the internal clock reference time by calculating FFT ($r_j$)*FFT*($s_i$) s is a signal that is derived from the internal clock of the PS. i is the index of the subcarrier.

The multiplication of the received Sub-Carriers (SC) vector with the internal derived signal phase conjugate yields the Phase Difference (PD) phasors vector which yields the phases between the subcarriers and internal signal. The phasors envelop provides the pattern of the phase differences along the phasor elements from 1 to M.

The envelop of the pattern of the phase differences is sinusoidal and comprises two parts. The first part is composed of an integer number of sinus periods.

At block 525 the PS analyzes the phase difference average along the phasors. The average is multiplied by N and is divided by 2π to get K, J and L. K is an integer number providing the number of full periods, J is the quantity of subcarriers within a sampling period. and L is the quantity of subcarriers in the tail.

At block 530, the PS calculates the Time of Arrival (ToA) using the envelop of the phase differences between the radio signal (r) subcarriers and the internal clock signal phase (s).

The ToA is calculated as follows:

K*(sampling duration time)+—L/J*(sampling duration time) yielding:

$$ToA = (K + L/J) \cdot T_s$$

Where $T_s$ is the sampling duration time.

At block 535 PS delivers the ToA to the Core Positioning Function to accomplish the target UE position calculation.

Blocks 500,505,510,510,520,525,530 and 535 may be implemented by any PS in the target area.

At block 540 the Core Positioning Function calculates the DToA (by using 2 PS ToA results) and performs triangulation for locating the target end terminal position by processing the ToA values which were collected from the relevant Positioning Sensors. The triangulation is based on calculated differential time of arrival from two PS units, known location of the SPs and the speed of light. The triangulation can be done by conventional methods solving a set of hyperbolic equations.

Figure 6:
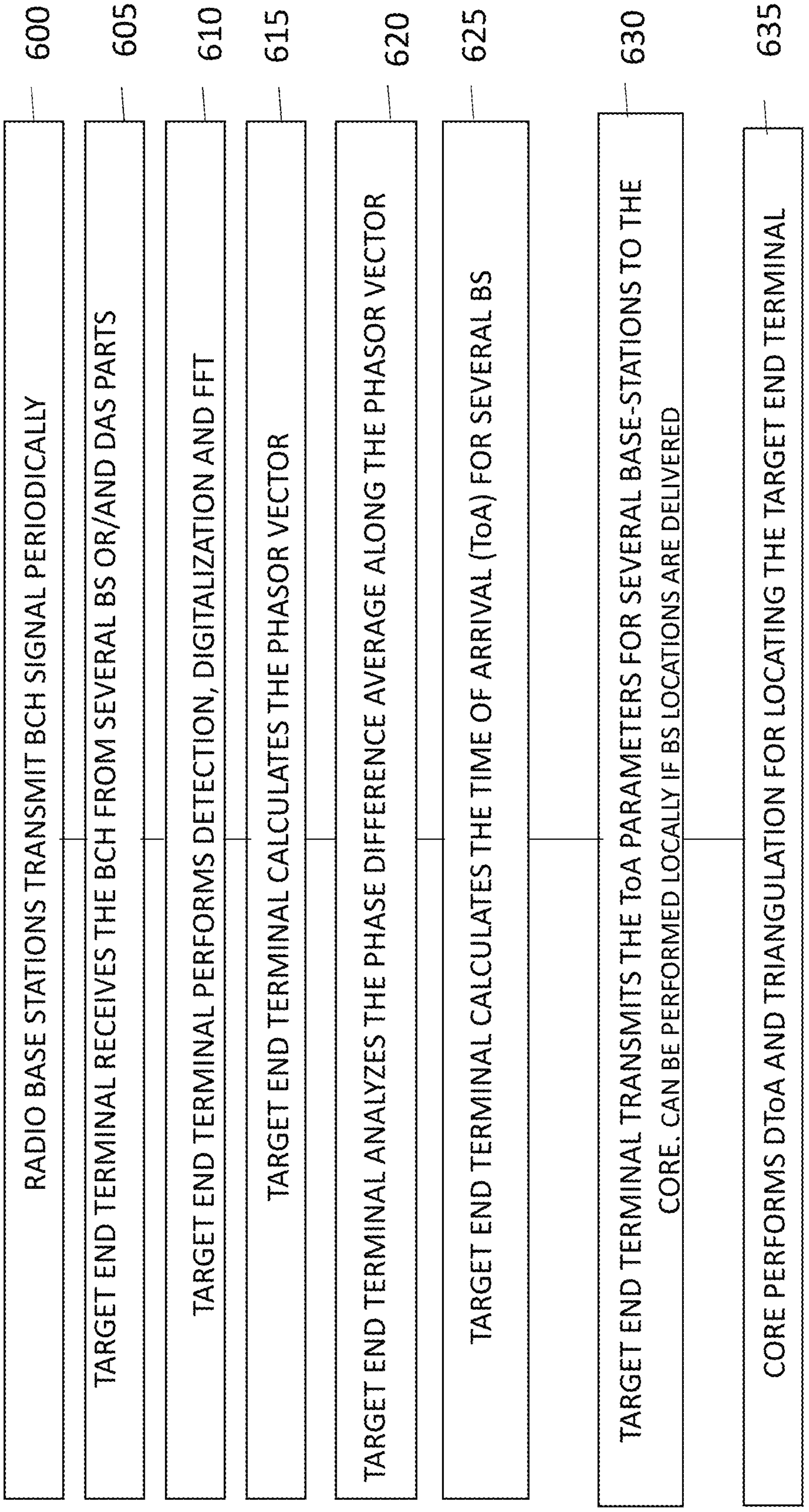
FIG. 6 shows a flowchart diagram of a method for accurate positioning end terminal in a wireless network by multiple base stations, in accordance with some exemplary embodiments of the disclosed subject matter.

FIG. 6 shows a flowchart diagram of a method for accurate positioning of end terminal in a wireless network by multiple base stations (BS), in accordance with some exemplary embodiments of the disclosed subject matter.

According to some embodiments the end terminal calculates its Time of Arrival (ToA) using received signals from the nearby base stations and delivers the calculated ToA for each base-station to the core server for performing DToA and triangulation using the Time of Arrival measurements and BS known locations.

Referring now to the drawing:

At block 600, the radio base stations transmit BCH (Broadcast Channel) signal including DMRS and/or PRS signals in the downlink.

At block 605 the target end terminal receives the BCH (Broadcast Channel) signal from the radio base station. The received BCH of radio station i is defined herein as $r_i$.

At block 610, the target end terminal performs detection, digitalization and FFT (Fast Fourier Transform) of the received BCH signal yielding a complex digital vector, the vector includes M complex elements, herein {FFT ($r_i$)}. Each complex element represents a subcarrier. M represents the total number of OFDM signal RS subcarriers within the received symbol.

At block 615, the target end terminal calculates the phase difference between each subcarrier by calculating FFT ($r_i$) *FFT*($s_i$). s is a signal that is derived from the internal clock of the target end terminal. i is the index of the subcarrier.

The multiplication for the received Sub-Carriers (SC) vector with the internal derived signal conjugate yields the Phase Difference (PD) phasor vector which yields the phases between the subcarrier and internal signal. The phasors vector envelop provides the pattern of the phase differences along the phasor vectors elements from 1 to M.

The envelop of the pattern of the phase differences is sinusoidal and comprises two parts. The first part is composed of an integer number of sinus periods.

At block 620 the target end terminal analyzes the phase difference average along the phasors vector. The average is multiplied by N and is divided by 2π to get K, J and L. K is an integer number providing the number of full periods, J is the quantity of subcarriers within a sampling period. and L is the quantity of subcarriers in the tail.

At block 625, the target end terminal calculates the Time of Arrival (ToA) using s and r phases difference.

The ToA is calculated as follows:

K*(signal sampling duration time)+—L/J*(signal sampling duration time) yielding:

$$ToA = (K + L/J) \cdot T_s$$

Where $T_s$ is the sampling duration time.

At block 630 the target end terminal transmits the Time of Arrival measurements to the core.

Blocks 600, 605, 610, 615, 620, 625 and 630 may be implemented for each signal received from each base-station in the proximity of the end terminal.

At block 635 the Core Positioning Function performs DToA (using ToA measurements related to 2 BS) followed by triangulation for locating the target end terminal position. The triangulation is based on the differential time of arrival results I, known location of the base stations and the speed of light which enable carrying out the accurate position calculation. As above, the triangulation can be done by conventional methods solving a set of hyperbolic equations.

FIG. 7 shows a flow chart diagram of a method for positioning an end terminal in a wireless network by neighbor end terminals which position is known, in accordance with some exemplary embodiments of the disclosed subject matter.

At block 700, the radio base station transmits a request for the target end terminal to transmit a Sounding Reference Signal—SRS signal. The SRS can be periodically transmitted every several OFDM symbols.

At block 705, the end terminal transmits the SRS signal which is scrambled uniquely for this terminal.

At block 710 the SRS message is received at the neighbor end terminals which location is known to the core and that are set to receive the target signal. The received SRS at neighbor i is termed herein as $r_i$.

At block 715, the neighbor end terminal performs detection, digitalization and FFT (Fast Fourier Transform) on the signal that is received from the target end terminal for transforming the received radio signal symbol into a complex digital vector in the frequency domain, the vector includes H complex numbers, herein {FFT ($r_i$)}. Each complex element represents a subcarrier. H represents the total number of OFDM signal SRS symbol subcarriers allocated for the target end terminal which positioning is in process.

If there is no information on the scrambling sequence, envelop detection is carried out followed by absolute value processing and analyzing the distance between the envelop's minimum points. These minimum points are π (180°) degrees apart. By sine wave curve fitting, the best sine wave fit can be found enabling accurate processing of the ToA.

At block 720, the neighbor end terminal calculates the phase difference between each subcarrier by calculating FFT ($r_i$)*FFT*($s_i$). s is a signal that is derived from the internal clock of the neighbor end terminal and i is the index of the subcarrier.

The multiplication for the Sub-Carriers (SC) vector with the internal derived signal phase yields the Phase Difference (PD) phasors vector which gives the phases between the received subcarrier and the internal clock time reference. The phasors vector envelop provides the pattern of the phase differences along the phasors vector elements from 1 to H.

The envelop of the pattern of the phase differences is sinusoidal and comprises two parts. The first part is composed of an integer number of sinus periods.

At block 725 the neighbor end terminal analyzes the average of the phase difference along the phasors vector. The average is multiplied by N and is divided by 2π to get K, J and L. K is an integer number providing the number of full periods, J is the quantity of subcarriers within a period. and L is the quantity of subcarriers in the tail.

At block 730, the neighbor end terminal calculates the time of arrival (ToA) using s and r phases difference.

The ToA is calculated as follows:

K*(signal sampling duration time)+—L/J*(signal sampling duration time) yielding:

$$ToA = (K + L/J) \cdot T_s$$

Where $T_s$ is the signal sampling duration time.

At block 735 the ToA is delivered to the Core Positioning Function for calculating the position.

Blocks 705, 710, 715, 720, 725, 730 and 735 may be performed for any neighbor end terminal in the proximity of the target end terminal.

At block 740 the Core Positioning Function calculates the DToA (using ToA for a pair of neighbors) and performs triangulation for locating the target end terminal position. The triangulation is based on the differential time of arrival measurements measured by the neighbor's end terminal whose location is pre-known. Known location of these neighbor end terminals and the speed of light enables to carry out the calculation.

FIG. 8 shows a configuration of known location end user terminals and an unknown location end user terminal.

Compensating the network elements random misalignment time: Elements including BS, UE and PS units have a small random time shift which may decrease the accuracy of ToA measurements performed by above procedures.

For the single site with DAS antenna case (FIG. 3) this is not relevant as the differential processing at a common site cancels these shifts.

For all other cases the process takes care to avoid these shifts impact.

Elements related random time shift are marked by $\tau_i$., the measured time of arrival which includes the propagation delay, and the time shifts is marked by $\Delta_{kj}$. and the distance between elements k and j is $D_{kj}$.

The following method is carried out by the Core: at the DToA calculation.

For the reference—$UE_R$, the following equations are set (c is the light velocity):

$$D_{R1}/c = \Delta_{R1} + \tau_R - \tau_1 \text{ thus } \tau_1 = \Delta_{R1} + \tau_R - D_{R1}/c$$

-continued $$D_{R2}/c = \Delta_{R2} + \tau_R - \tau_2 \text{ thus } \tau_2 = \Delta_{R2} + \tau_R - D_{R2}/c$$

$$D_{R3}/c = \Delta_{R3} + \tau_R - \tau_3 \text{ thus } \tau_3 = \Delta_{R3} + \tau_R - D_{R3}/c$$

For the Unknown location UE-$UE_N$, the following equations are set;

$$D_{N1}/c = \Delta_{N1} + \tau_N - \tau_1$$

$$D_{N2}/c = \Delta_{N2} + \tau_N - \tau_2$$

$$D_{N3}/C = \Delta_{N3} + \tau_N - \tau_3$$

The differential time of arrival—DToA—for the signals from $UE_1$ and $UE_2$ is given by:

$$DToA_{12} =$$

$$D_{N1}/c - D_{N2}/c = \Delta_{N1} + \tau_N - \tau_1 - \Delta_{N2} - \tau_N + \tau_2 = \Delta_{N1} - -\Delta_{N2} - \tau_1 + \tau_2 - \tau_1 +$$

$$\tau_2 \text{ can be replaced by } \Delta_{R2} + \tau_R - D_{R2}/c - \Delta_{R1} - \tau_R + D_{R1}/c$$

$$\text{Yielding} - \tau_1 + \tau_2 = \Delta_{R2} - -\Delta_{R1} + D_{R1}/c - D_{R2}/c$$

$$\text{Thus } DToA12 = D_{N1}/c - D_{N2}/c =$$

$$\Delta_{N1} - -\Delta_{N2} - \tau_1 + \tau_2 = \Delta_{N1} - \Delta_{N2} + \Delta_{R2} - \Delta_{R1} + D_{R1}/c - D_{R2}/c$$

The result states that $DToA_{12}$ is given only by precisely measured parameters ($\Delta_{N1}$, $\Delta_{N2}$, $\Delta_{R2}$, $\Delta_{R1}$) and pre-known parameters ($D_{R1}$, $D_{R2}$, c).

The result presents that the Core can calculate the DToA without the network elements random time shifts influence.

The same is carried out for calculating $DToA_{13}$ and $DToA_{23}$.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should be noted that, in some alternative implementations, the functions noted in the block of a figure may occur out of the order noted in the figures. For example, two blocks shown in succession may, in fact, be executed substantially concurrently, or the blocks may sometimes be executed in the reverse order, depending upon the functionality involved.

What is claimed is:

1. A method the method comprises:

at a single site of a radio network; said single site comprises Distributed Antenna System (DAS); said Distributed Antenna System (DAS) comprises at least three antenna elements; said antenna elements being deployed in said single site apart from each other and being in connectivity with a common Radio Unit with a plurality of radio frontend receivers each per antenna element;

receiving, replicas of a radio signal transmitted by a target end terminal, each of said replicas being received by an antenna element of said distributed RX antenna;

By FFT (Fast Fourier Transform), transforming each of said replicas into a subcarriers complex vector in said frequency domain; wherein each complex element of said complex vector represents a sub carriers of said radio signal;

calculating a phase difference between corresponding subcarriers of each pair of said complex vectors to thereby generating a Phase Difference phasors vector;

calculating, from an envelope pattern periodicity of said phase difference phasors vector, a differential time of arrival and accurately position of said user end terminal in accordance with said differential time of arrival measurements.

2. The method of claim 1, wherein said transforming comprises sampling and digitalization and conversion to frequency domain.

3. The method of claim 1, further comprising calibrating positioning process by comparing said positioning to a pre known position of an end terminal.

4. A system of a single site of a radio network; said system comprises Distributed Antenna System (DAS) and a radio unit;

said Distributed Antenna System (DAS) comprises at least three antenna elements; said antenna elements being deployed in said single site apart from each other—and being in connectivity with said Radio Unit with a plurality of radio frontend receivers each per antenna element;

said radio unit is configured for receiving, replicas of a radio signal transmitted by a target end terminal, each of said replicas being received from an antenna element of said distributed RX antenna; By FFT (Fast Fourier Transform), transforming each of said replicas into a subcarriers complex vector in said frequency domain; wherein each complex element of said complex vector represents a sub carrier of said radio signal; calculating a phase difference between corresponding subcarriers of each pair of said complex vectors to thereby generating a Phase Difference phasors vector; and calculating, from an envelope pattern periodicity of said phase difference phasors vector, a differential time of arrival and accurately positioning of said user end terminal in accordance with said differential time of arrival calculations.

5. The system of claim 4, further comprising a known position unit in connectivity with said radio unit; said known position unit being configured for calibrating said positioning process.

6. A method, said method comprises: at a target area, said target area comprises at least three positioning sensors:

receiving, by a positioning sensor of said positioning sensors, a radio signal, said radio signal being transmitted from a target end terminal;

by said positioning sensor, transforming said radio signal into a complex digital vector; said vector comprises complex elements, each complex element representing a subcarrier of said radio signal;

by said positioning sensor, calculating a phase difference between subcarriers of said digital vector and an internal clock related reference;

by said positioning sensor calculating, Time of Arrival (ToA), from an envelope pattern periodicity of said phase difference between said radio signal and said internal clock related reference and accurate a positioning of said target end terminal in accordance with said time of arrivals received from said at least three positioning sensors.

7. The method of claim 6, wherein said positioning sensor comprises a radio receiver and a digital signal processor.

8. The method of claim 6 further comprising monitoring by a Centralized Cloud Positioning Server linked by a communication channel, said communication channel being wired or Wireless channel; Wherein said Cloud Positioning Server sets at pre-allocated time slot a control signaling including allocated resources for a plurality of User Terminals transmitting in said time slot, said allocation is in time and frequency said frequency being OFDMA symbol and RB's Subcarriers in frequency for 4G/5G, said positioning units return said time of arrival (ToA) measurements in a short message.

9. The method of claim 6 wherein a CPS Calibration process collects said ToAs delivered from said sensors and carries out calibration of an internal processing delay for each sensor using a pre-known locations User Equipment and applying corrections to said Unknown location user equipment measured Time of Arrival.

10. The method of claim 6 wherein a CPS (Cloud Positioning Server) for each User Equipment processes a corrected ToA from different Sensors and creates DToA by subtracting between mating measurements results and applying localization and mapping algorithm, wherein said CPS DToA algorithm is applied for LoS (Line of Sight) by selecting a LOS linked Positioning Sensors for increasing said probability for LoS and by applying selection from a set of PSs that yields closer positioning results and omit Positioning Sensors which position measurements cause a diversion in said processing convergence.

11. The method of claim 6 wherein for near and non-line of sight—NLoS a CPS applies a finger printing algorithm coupled with artificial intelligence learning said ToA fingerprint stamp arriving from said sensors at training time, training begins with known location elements and creates data sets that enable a DL—Deep Learning inference network model for said localization in said coverage area.

12. A system at a target area, said system comprises at least three positioning sensors and a target end terminal;

said target end terminal is configured for transmitting a radio signal;

said positioning sensor is configured for receiving said radio signal, said radio signal being transmitted from a target end terminal; for transforming said radio signal into a complex digital vector; said vector comprises complex elements, each complex element representing a subcarrier of said radio signal; calculating said phase difference between subcarriers of said digital vector and an internal clock related reference; for calculating Time of Arrival (ToA), from an envelope pattern periodicity said phase difference, between said radio signal and said internal clock related reference and accurate positioning of said target end terminal in accordance with said time of arrivals received from said at least three positioning sensors.

13. A method said method comprises:

at a radio network, said radio network comprises at least three radio base stations, receiving BCH (Broadcast Channel) signals; said BCH being transmitted from a radio base station of said at least three radio base stations; said BCH being received at a target end terminal;

by said target end terminal, processing said BCH into a complex digital vector, wherein each complex element of said vector representing a Reference Signal subcarrier of said BCH;

by said target end terminal, calculating a phase difference between subcarriers of said digital vector and an internal clock related reference;

by said target end terminal, calculating a Time of Arrival (ToA), from said phase difference, between said BCH signal and said internal clock related reference to, thereby, accurate positioning of said target end terminal in accordance with said differential time of arrivals calculated from at least 3 BCH signals transmitted from said at least three radio base stations.

14. A system of a radio network, said system comprises:

at least three radio base stations, and a target end terminal;

said radio base station being configured for transmitting a BCH (Broadcast Channel) signal;

said target end terminal being configured for receiving said BCH (Broadcast Channel) signals, for processing said BCH into a complex digital vector, wherein each complex element of said vector representing a Reference Signal subcarrier of said BCH; for calculating a phase difference between subcarriers of said digital vector and an internal clock related reference; for, calculating Time of Arrival (ToA), from said phase difference between said BCH signal and said internal clock related reference to, thereby, accurate positioning of said target end terminal in accordance with said differential time of arrivals calculated from at least 3 BCH signals transmitted from said at least three radio base stations.

15. A method the method comprises:

at an area of a radio network, the radio network covers a target area and comprises in the target area a target end terminal and at least three known location neighboring end terminals;

receiving by a neighboring end terminal from the neighboring end terminals, an SRS signal, the SRS signal being transmitted from the target end terminal;

by the neighboring end terminal, detecting and transforming the SRS signal into a complex digital vector, the vector comprises complex elements; each complex element representing a subcarrier of the SRS signal;

by the neighboring end terminal, calculating a phase difference between subcarriers of the digital vector and an internal clock related reference;

by the neighboring terminal calculating Time of Arrival (ToA), from the phase difference between the SRS signal and the internal clock related reference to, thereby, accurate positioning the target end terminal in accordance with the differential time of arrivals received from the at least three neighboring end terminals.

16. The method of claim 15, wherein the SRS message being transmitted in response to a request from a radio base station.

17. A system at an area of a radio network, the radio network covers a target area, the system comprises: in the target area a target end terminal and at least three known location neighboring end terminals;

target end terminal is configured for transmitting an SRS signal, the SRS signal being transmitted from the target end terminal;

the known location neighboring end terminals are configured for receiving the SRS signal, for transforming the SRS signal into a complex digital vector, the vector comprises complex elements; each complex element representing a subcarrier of the SRS signal, for calculating a phase difference between subcarriers of the digital vector and an internal clock related reference and calculating Time of Arrival (ToA), from the phase difference, between the SRS signal and the internal clock related reference to, thereby, accurate positioning the target end terminal in accordance with the time of arrival received from the at least three neighboring end terminals.

* * * * *